S. F. SLAWSKI

Oct. 6, 1931. FOLDING IRONING BOARD Re. 18,223

Original Filed Oct. 26, 1926 2 Sheets-Sheet 1

INVENTOR.
Stephen F. Slawski

BY
Stevens Talbot
ATTORNEY.

S. F. SLAWSKI

Oct. 6, 1931. FOLDING IRONING BOARD Re. 18,223

Original Filed Oct. 26, 1926 2 Sheets-Sheet 2

INVENTOR.
Stephen F. Slawski

BY
Attorney

ATTORNEY.

Reissued Oct. 6, 1931 Re. 18,223

UNITED STATES PATENT OFFICE

STEPHEN F. SLAWSKI, OF CULVER CITY, CALIFORNIA

FOLDING IRONING BOARD

Original No. 1,688,289, dated October 16, 1928, Serial No. 144,282, filed October 26, 1926. Application for reissue filed June 3, 1929. Serial No. 368,128.

The object of the invention is to provide a folding as well as an adjustable ironing board which is so constructed that it can be entirely enclosed, when not in use, in a wall pocket having a depth as shallow as that formed by three inch studding; to provide a device of this character that may be readily extended to and locked in operative position, and when in such position, adjusted laterally and quickly and effectively clamped to most effectively meet the convenience of the operator; and to provide a construction of this sort which will enable the architect, in planning, to arrange the room to better advantage than the ordinary form of folding ironing board which will usually interfere with adjacent walls, stoves, sinks, breakfast-nooks, cupboards and the like, and obstruct door openings.

An important object of the invention is to provide an ironing board which may be swung in a horizontal plane after it has been extended from the wall cabinet and which is supported from the wall structure by supporting means having collapsible braces therewith which are of ample strength to carry the loads imposed during the use of the ironing board, thereby eliminating necessity for braces extending from the lower side of the swingable ironing board to the floor or other point of support.

With these objects in view, the invention consists in a construction and combination of parts of which a preferred embodiment is illustrated in the accompanying drawings, wherein.

Figure 1:
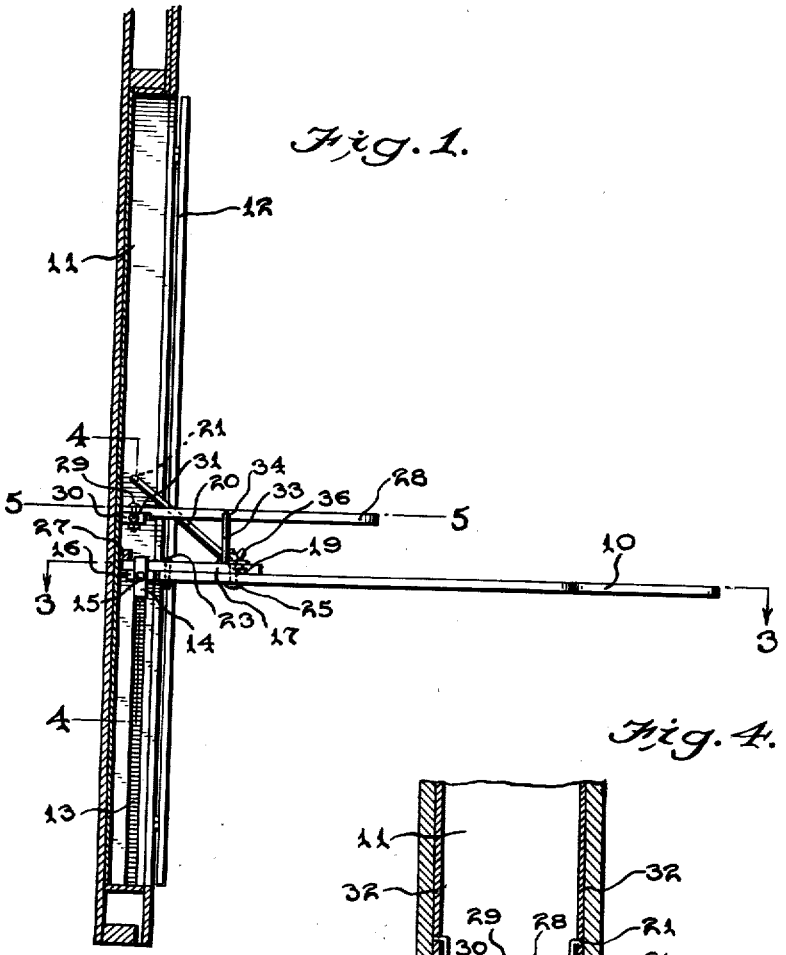
Fig. 1 is a side elevational view showing the invention arranged in operative position, the wall pocket being shown in section.
Figure 4:
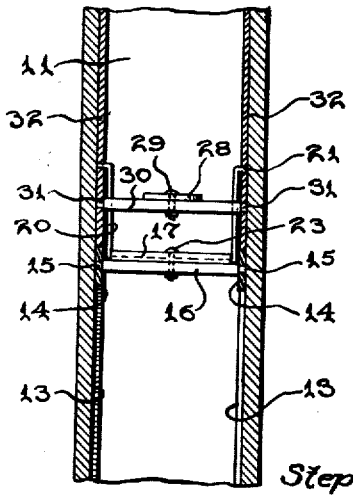
Fig. 4 is a sectional view on the plane indicated by the line 4—4 of Fig. 1.
Figure 6:
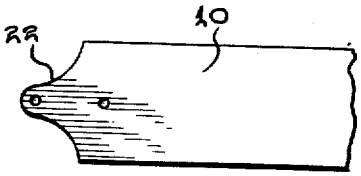
Fig. 6 is a view of the board.
Figure 3:
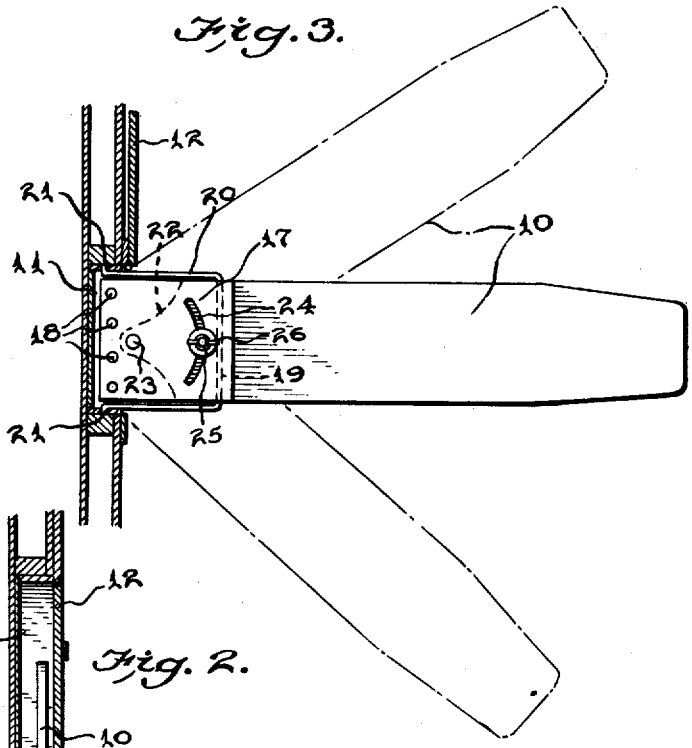
Fig. 3 is a sectional view on the plane indicated by the line 3—3 of Fig. 1.
Figure 2:
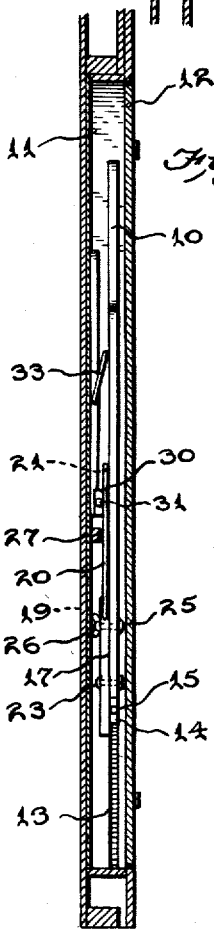
Fig. 2 is a view similar to Fig. 1 but showing the board in folded position.
Figure 5:
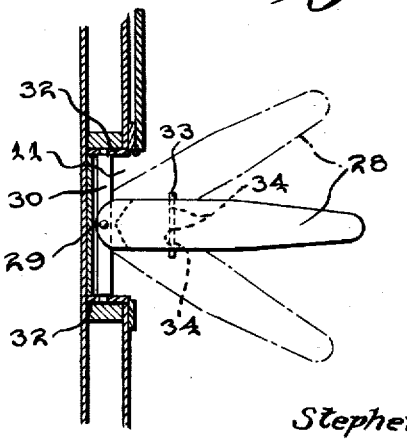
Fig. 5 is a sectional view on the plane indicated by the line 5—5 of Fig. 1.

The board 10, when not in use, is adapted to be arranged vertically and disposed within a pocket 11 formed in the wall of the room, the pocket being provided with a closure in the form of a door 12 to cover the board when not in use. Guide grooves 13 are formed in the opposite side walls of the pocket 11 and slidably engaged in these grooves are the slides 14, the latter being formed at the remote end of a rocker bar 16. A plate 17 is secured to the rocker bar by means of bolts 18 and on the under face at the end remote from the rocker bar there is formed in the plate 17 a groove 19, this groove receiving the transverse portion of a stirrup 20, the arms of which at the free ends are outturned, as indicated at 21, to provide gudgeons pivotally engaging sockets formed in the opposite side walls or guides of the pocket 11.

The plate 17 supports the board 10, the latter at the forward end being tapered, as indicated at 22. A bolt 23 extends through the plate 17 and through the board at the apex of the tapered portion, thus providing a pivotal connection between the board and the plate. The plate is also provided with an arcuate slot 24 concentric with the bolt 23 and the board is provided with a bolt 25 extending through the slot 24 and receiving on its upper end a wing nut 26. Obviously, this construction provides for the adjustment of the board laterally with the bolt 23 as a pivot, the bolt 25 serving to clamp the board in adjusted position.

The board 10 engaging the plate 17 on the under face, serves to close the slot 19 and thus pivotal connection between the plate 17 and the stirrup is provided, the stirrup also having pivotal connection with the side walls of the pocket. By means of this arrangement, the board may be extended to horizontal operative position or folded into vertical position within the pocket, merely by respectively elevating the rear end of the board or depressing the plate 17, the slides 14 in this operation moving down into the grooves 13 and the stirrup swinging on its pivotal connections with the pocket and the board until it reaches an approximate vertical position, when the board is disposed in vertical position within the pocket.

The extended or operative horizontal position of the board is maintained by a transverse bar 27 secured transversely of the pocket against the rear wall thereof, this bar over hanging the inner end of the plate in the horizontal position of the board and acting as an abutment stop. The board is thus supported horizontally jointly by the stirrup and the stop 27, the slides preventing any movement of the board longitudinally.

The sleeve board 28 is pivotally secured at its forward end, as indicated at 29, with a transverse rocker bar 30, the latter having trunnions or gudgeons 31 engaged in bearing plates 32 mounted on the side walls of the pocket. The pivot-connection of the board 28 with the rocker bar provides for its being moved laterally just as in the case of the main board, with the exception that no means is provided for locking it in different angular positions, as this is unnecessary.

To support the sleeve board when extended, the U-shaped member 33 is provided, this member having inturned extremities 34 engaged in sockets in the opposite side edges of the sleeve board. The U-shaped member bears upon the upper face of the main board 10 when supporting the sleeve board and, when the latter is not in use and arranged in folded position within the pocket, the U-shaped member may be folded down against the under face thereof.

From the foregoing description it will be perceived that the horizontally swingable ironing board 10 in extended position requires no support other than its connection with the plate member 17. The downthrust exerted on the plate 17 when the ironing board 10 is being used is received and carried by the folding supporting member 20 which connects to the outer portion of the plate 17 but does not make actual engagement with the ironing board 10, thereby permitting the ironing board to be freely swung in a horizontal plane and presenting no obstruction to the placing of garments on the ironing board, which articles due to their form must extend underneath the board. It is known that certain parts of the invention are representative of other parts, devices or elements which may be used to accomplish identical results in substantially the same manner.

Therefore, it is not intended that the invention be considered limited to the details of the embodiment disclosed herein but shall be accorded the full scope of the following claims.

The invention having been described, what I claim as new and useful is:

1. A folding ironing table comprising a board having a transverse plate with which the board is pivotally connected at its forward end for angular adjustment in a horizontal plane, a rocker bar connected with said plate, and provided with trunnions at its extremities, slides with which said trunnions are engaged, side walls having grooves traversed by the slides, and a folding supporting member connected with the plate at a point remote from the rocker bar and having pivotal mountings in the side walls.

2. A folding ironing table comprising a board having a transverse plate with which the board is pivotally connected for angular adjustment in a horizontal plane, a rocker bar connected with said plate and provided with trunnions at its extremities, side walls having grooves for guiding the trunnions, and a folding supporting member connected with the plate at a point remote from the rocker bar and having pivotal mountings in the side walls.

3. A folding ironing table of the character described, including: a structure adapted for incorporation in a wall; an ironing board; a supporting member having pivotal connection with the inner end of said ironing board enabling lateral adjustment of said ironing board, said supporting member being connected to said structure so as to move between vertical and horizontal positions; and a swingable support having its inner end pivotally connected to said structure and its outer end pivotally connected to the outer portion of said supporting member, said swingable support being so connected with said supporting member as to swing therewith between non-supporting and supporting positions as said ironing board is moved between vertical and horizontal positions.

4. A folding ironing table of the character described, including: a structure adapted for incorporation in a wall; an ironing board; a supporting member having pivotal connection with the inner end of said ironing board for lateral adjustment of the board, and having its inner end slidable vertically into said structure; and a foldable member pivoted to said structure and said supporting member for resisting loads imparted to the outer portion of said supporting member by said ironing board when said ironing board is in extended position, said foldable member automatically swinging into supporting position when said supporting member is swung to horizontal position.

5. A folding ironing table of the character described, including: a structure adapted for incorporation in a wall and having substantially vertical grooves therein; an ironing board; a supporting plate having pivotal connection with the inner end of said ironing board for lateral adjustment of the board; laterally projecting means extending from said supporting plate and sliding in said grooves; and a bracing member pivoted to said structure and having connection with the outer portion of said supporting plate, said bracing member resting in vertical position when said supporting plate is swung into vertical position and swinging to a position extending diagonally when said supporting plate is swung out from said structure, so as to support said plate and said ironing board in horizontal position.

Signed at Los Angeles, in the county of Los Angeles and State of California, this 7th day of May, 1929.

STEPHEN F. SLAWSKI.

DISCLAIMER

Re. 18,223.—*Stephen F. Slawski*, Culver City, Calif. FOLDING IRONING BOARD. Patent dated October 6, 1931. Disclaimer filed December 16, 1940, by the patentee.

Hereby enters this disclaimer to claims 3, 4, and 5.

[*Official Gazette January 21, 1941.*]